June 22, 1965     H. E. ROBB, JR     3,191,068
CONTROL CIRCUIT
Filed Nov. 29, 1962
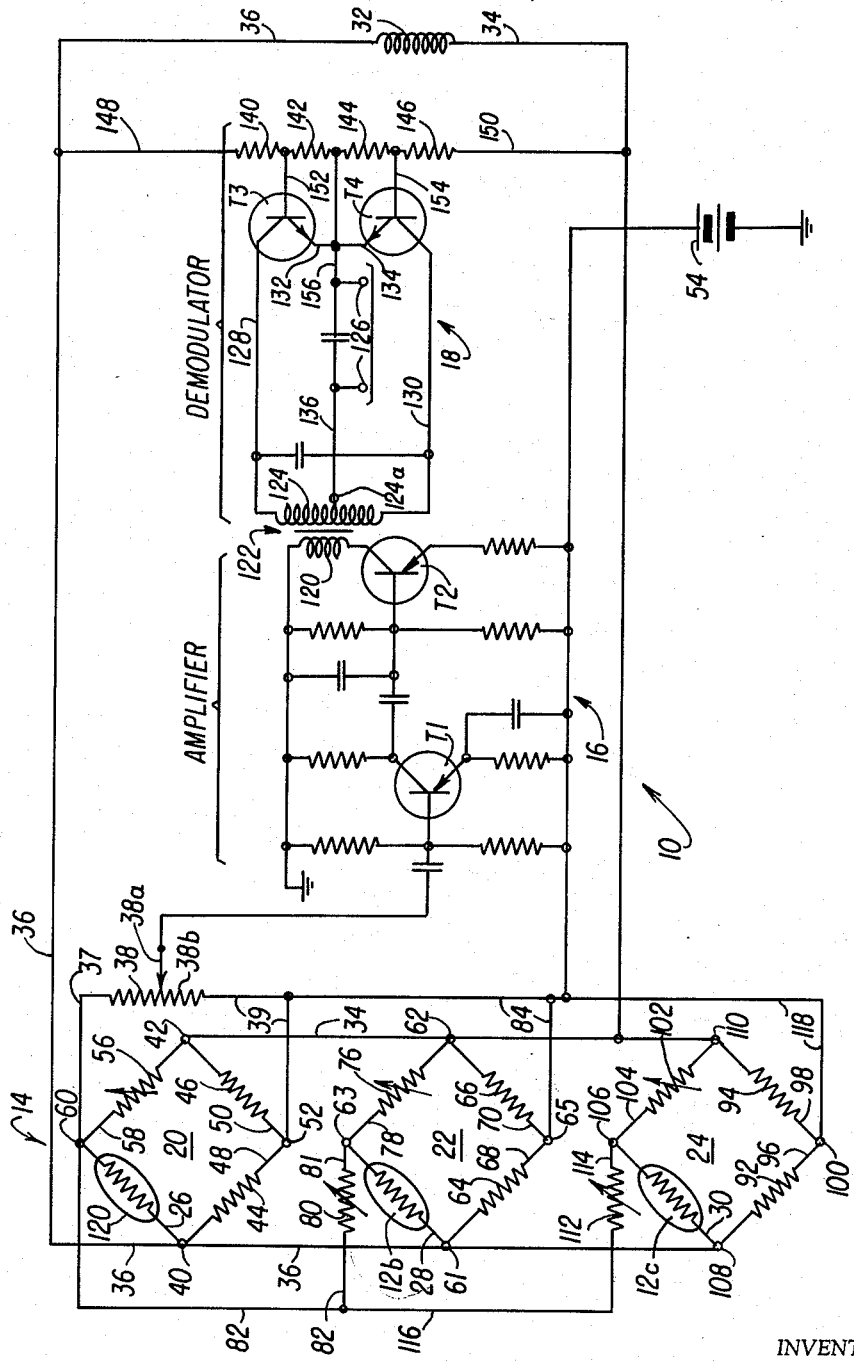
INVENTOR.
HAROLD E. ROBB JR.
BY
Byron, Hume, Groen & Clement
ATTYS.

United States Patent Office 3,191,068
Patented June 22, 1965

3,191,068
CONTROL CIRCUIT
Harold E. Robb, Jr., Elk Grove Village, Ill., assignor to The Powers Regulator Co., Skokie, Ill., a corporation of Illinois
Filed Nov. 29, 1962, Ser. No. 240,806
3 Claims. (Cl. 307—88.5)

The present invention relates to a control system and, more particularly, to a control system that is particularly designed to regulate the operating conditions of a controlled arrangement.

It is an object of the present invention to provide a new and improved control system.

It is another object of the present invention to provide a control system that is adapted to maintain a controlled arrangement within predetermined operating limits.

It is a further object of the present invention to provide a control system adapted to generate error signals that maintain a controlled arrangement at a predetermined operative condition.

It is yet a further object of the present invention to provide a control system that produces an error signal having characteristics proportional to the change in the operative condition of a controlled arrangement.

It is yet another object of the present invention to provide a control system that is responsive in different degrees to separate operative conditions of a controlled arrangement.

The above and other objects are realized in accordance with the present invention by providing for a controlled arrangement a new and improved control system. The control system functions, in response to a change in the operative condition of the controlled arrangement, to produce an error signal having characteristics proportional to the change in the operative condition of the controlled arrangement. The error signal, in turn, is supplied to the controlled arrangement, including suitable corrective devices, to restore the controlled arrangement to the desired operative condition.

The invention both as to its organization and method of operation, taken with further objects and advantages thereof, will best be understood by reference to the following description taken in connection with the accompanying drawings in which:

FIG. 1 is a schematic view of a control system embodying the features of the present invention.

Considering now the drawing, a control system embodying the features of the present invention is illustrated and is generally identified by reference numeral 10. The control system is particularly designed to be used with a controlled arrangement, for example, a conventional heating system, not illustrated for purposes of simplicity. In operation, the control system 10 functions to maintain the controlled arrangement (not shown) at a desired operative condition by generating error signals proportional to the change in the operative condition of the arrangement. In response to these error signals, the controlled arrangement automatically restores itself to the desired operative condition. As a result, any imbalance in the controlled arrangement is eliminated and the error signal reduced to zero so that the control system is returned to its quiescent condition.

Briefly, the control system 10 includes a plurality of sensing elements 12 associated with the controlled arrangement. For example, the sensing elements 12 may comprise thermistors or thermostatic devices located in predetermined areas, some of which areas are heated, for example, by the controlled arrangement (not shown). Thus, when the temperature changes in any one of the areas in which a sensing device 12 is located (hereinafter called monitored areas), an A.C. signal is generated by a bridge circuit 14 associated with the sensing devices 12. The A.C. bridge signal is amplified by an amplifier circuit 16 and then the amplified A.C. signal is coupled to a demodulator circuit 18. The demodulator circuit 18, in turn, produces a D.C. error signal that is supplied to the controlled arrangement and, specifically, to an ignition device associated with a furnace to increase or decrease the heat supplied to the monitored areas. The D.C. error signal specifically has a magnitude and polarity corresponding to the magnitude and phase of the A.C. bridge signal so that for a specific change in the operative condition of the controlled arrangement, the necessary corrective signal is supplied by the control system 10.

Considering specifically the bridge circuit 14, it includes, for example, three bridge networks 20, 22, and 24, having, respectively, in their arms 26, 28, and 30, the sensing elements 12a, 12b, and 12c respectively. The networks 20, 22, and 24 are energized by an A.C. voltage source 32 connected via conductors 34 and 36 across the horizontal diagonals of the bridge networks 20, 22, and 24. Each of the bridge networks is so arranged that for a specific condition of the sensing elements 12, the bridge network is balanced, thereby producing no output voltage across the vertical diagonal and, hence, across a bridge potentiometer 38. However, with the bridges 20, 22, and 24 being connected in parallel, the voltages produced by each unbalanced bridge network are additive so that a resultant additive voltage is developed across the bridge potentiometer 38.

Inasmuch as each of the bridge networks is substantially identical, only the bridge network 20 will be described in detail. With respect to the horizontal diagonal of the network 20, the conductor 36 (connected to the A.C. source 32) is connected to junction 40 of bridge arms 26 and 48, while conductor 34 (connected to the A.C. source 32) is connected to junction 42 of bridge arms 50 and 58. With respect to the vertical diagonal of the network 20, a conductor 37 interconnects the upper end of the potentiometer winding 38b and a junction 60 of bridge arms 26 and 58 while a conductor 39 connects a junction 52 of the bridge arms 48 and 50 with the lower end of the potentiometer winding 38b, which is also connected to a D.C. voltage supply 56. As illustrated, a pair of substantially identical resistors 44 and 46 are respectively connected in the bridge arms 48 and 50 so as to serially extend between the junctions 40 and 42. On the other hand, the sensing element 12a is connected to the bridge arm 26, while a variable resistor 56 is located in the bridge arm 58. It will be appreciated that the variable resistor 56 functions to balance the bridge network 20 for a particular condition of the sensing element 12a i.e., functions to maintain identical voltages at junctions 60 and 52 so that no voltage differential exists across the vertical diagonal and no bridge voltage is supplied to the bridge potentiometer 38. If a different operating condition is desired at the monitored area, the variable resistor 56 is set accordingly, so that after the controlled arrangement automatically makes the necessary adjustment, the bridge network 20 assumes a different balanced condition.

Even though an A.C. voltage is applied across the horizontal diagonal of the bridge network 20, no output voltage is developed across the vertical diagonal (junction 52 and 60) and no voltage is likewise developed across the output potentiometer 38. However, if the condition of the sensing element 12a changes, for example, its temperature increases, the effective resistance of the sensing element 12a decreases, with the result that the bridge network 20 is unbalanced. In this case, different voltages are produced at the junctions 52 and 60 and, therefore, an A.C. voltage having, for example, a specific phase and amplitude, is produced across the bridge potentiometer 38. Specifically, if the temperature change is positive, the A.C. voltage across the potentiometer 38 will be, for example, inphase with the reference voltage supplied by source 32. Conversely, if the temperature change is negative, the A.C. voltage across the potentiometer 38 will be out-of-phase with the reference voltage. Moreover, irrespective of whether the temperature change is positive or negative, for every degree of temperature change in the monitored area, the output voltage will have a corresponding unit amplitude. The amplitude of the bridge output voltage is further controlled by the manual setting of the wiper 38a on the potentiometer winding 38b, so that for every degree of temperature change detected by the sensing element 12a the amplitude of the bridge output voltage changes a desired proportional amount.

The bridge network 22, similar to the bridge network 20, also includes a pair of identical resistors 64 and 66 in its bridge arms 68 and 70, as well as a variable resistor 76 connected in its arm 78. Similar to the network 20, the reference voltage of the source 32 is applied to the horizontal diagonal of the network 22 at junctions 61 and 62 via conductors 34 and 36. When the bridge network 22 is balanced, no voltage differential exists across the vertical diagonals (junctions 63 and 65) so that no voltage is produced across the bridge potentiometer 38. However, contrary to the network 20, the sensitivity of the bridge network 22 can be adjusted independently of the bridge potentiometer 38. To this end, a variable resistor 80 is interconnected between the junction 63 of the potentiometer network 22 and the upper end of the output potentiometer 38. Particularly, one end of the variable resistor 80 is connected to the junction 63 by a conductor 81, while the other end of the resistor 80 is connected by a resistor 82 to the junction 60 of the network 20 which, in turn, is connected by conductor 37 to the upper end of the bridge potentiometer 38. To complete the circuit, the junction 65 is connected by conductors 84 and 39 to the lower end of the potentiometer 38, as well as the D.C. voltage source 54.

By this arrangement, instead of a unit of amplitude being produced across the output potentiometer 38 for every degree of temperature change, one-half or one-third of the unit of amplitude can be produced by a manual adjustment of the variable resistor 80. Hence, the sensitivity of the bridge network 22 can be readily changed, i.e., the voltage developed by the unbalanced bridge network 22 and additively supplied to the bridge output voltage (across the potentiometer 38) can be alternated or decreased to any desired degree.

The bridge network 24 is identical in construction to the bridge network 22 and also includes a pair of identical resistors 92 and 94 disposed in bridge arms 96 and 98 connected at junction 100. A variable resistor 102 is connected in bridge arm 104 which, with bridge arm 30, provides a junction 106. Similar to network 22, the A.C. reference voltage is supplied to the horizontal diagonal (junctions 108 and 110) by conductors 34 and 36. Similar to the networks 20 and 22, the vertical diagonals of the bridge network 24 are connected to the bridge potentiometer 38; as shown, the junction 106 is connected by conductor 114, variable resistor 112, conductor 116, conductor 82, conductor 37 to the upper end portion of the potentiometer 38, while the junction 100 is connected by conductors 118, 84, and 39 to the lower end of the potentiometer 38. As in the case of the network 22, variable resistor 112 functions to control the sensitivity of the bridge network 24.

As previously mentioned, the bridge networks 20, 22, and 24 are connected in parallel so that the voltages produced by any of the unbalanced bridge networks are additive. Thus, if it be assumed that the sensitivity resistor 80 is set so that the sensitivity of the bridge network 22 is 50% of that of the bridge network 20, and the sensitivity resistor 112 is set so that the sensitivity of the bridge network 22 is 25% of that of the bridge network 20, a single degree of temperature change in each of the monitored areas will produce, at the output potentiometer 38, a voltage having a 1¾ unit amplitude. Specifically, the bridge network 20 will produce a voltage having a unit amplitude, the bridge network 22 will produce a voltage having a one-half unit amplitude, and bridge network 24 will produce a voltage having a one-quarter unit amplitude. Inasmuch as the bridge networks 20, 22, and 24 are connected in parallel, the unbalanced output voltages of these networks add so that the bridge voltage developed across the potentiometer 38 will have a one and three-quarters unit amplitude.

The A.C. voltage developed by the bridge circuit 14 appears across the potentiometer 38, but the bridge output voltage is determined by the location of the wiper 38a on the potentiometer winding 38b. It is the latter voltage that is coupled to the amplifier circuit 16. The amplifier circuit comprises a two-stage cascaded transistorized amplifier which performs the sole functions of amplifying the bridge output voltage. More particularly, the amplifier circuit comprises a transistor T-1 and transistor T-2 embodying emitters, collectors and bases suitably biased by resistors and conductors interconnected between the D.C. voltage source and ground, as illustrated. A primary winding 120 of an output transformer 122 is connected in the collector-emitter circuit of the transistor T-2. Hence, the amplified A.C. bridge signal is fed to the amplifier output transformer 122 and is coupled by a secondary winding 124 to the demodulator circuit 18. It will be appreciated that inasmuch as the amplifier circuit 16 is two-staged, the phase of the amplifier output voltage is the same as the phase of the bridge output voltage. In addition, because of the amplifying action of the amplifier circuit 16, the amplitude of the amplifier output voltage is greater than that of the bridge output voltage by a factor equal to the gain or amplification ratio of the transistors T-1 and T-2.

Considering now the demodulator circuit 18 in greater detail, it constitutes a full wave, phase sensitive demodulator circuit including a pair of similarly polarized transistors T-3 and T-4. This demodulator circuit actually compares the A.C. amplifier output voltage with the A.C. reference voltage generated by the voltage source 32 and produces a D.C. voltage or signal across its output terminals 126. The output D.C. signal has a magnitude and polarity corresponding to the magnitude and phase of the amplifier output signal.

More particularly, the collectors of the transistors T-3 and T-4 are respectively connected by conductors 128 and 130 to the upper and lower ends of the center tapped secondary winding 124. The emitters on the other hand are connected together by conductors 132 and 134 which, in turn, are connected to one of the terminals 126, the other terminal being connected by conductor 136 to the center tap 124a of the secondary winding 124. The reference voltage is supplied to the base emitter circuits by a voltage divider arrangement comprising resistors 140, 142, 144 and 146 connected by conductors 138 and 150 across the A.C. voltage source 32. As shown, the base of the transistor T-3 is connected by conductor 152 to the junction of resistors 140 and 142, while the base of transistor T-4 is connected by conductor 154 to the junction of the resistors 144 and 146. To complete the circuit, a conductor 156 is interconnected between the junction of the resistors 142 and 144 and the junction of the base conductors 132 and 134, which is connected to one of the terminals 126.

Assuming that the A.C. amplifier output voltage coupled to the secondary winding 124 is "in-phase" with the A.C. reference voltage, a specific polarity exists across the secondary winding 124 and the base emitters of the transistors T-3 and T-4. If it be assumed that the "in-phase"

amplifier output voltage, during its first half cycle, is positive at the upper end of the winding 124 and negative at the lower end of the winding and, further, that the junction of resistors 140 and 142 is positive and the junction of resistors 144 and 146 is negative, transistor T-3 is rendered conductive while transistor T-4 remains non-conductive. Accordingly, during the first half cycle a positive D.C. voltage, for example, is produced across the output terminals 126.

During the second half cycle, the above described polarity of the amplifier output voltage and the reference voltage is reversed, with the result that the upper end of the secondary winding 124 is negative and the lower end is positive and, further, the junction of resistors 140 and 142 is negative and the junction of resistors 144 and 146 is positive. As a result, during the second half cycle, transistor T-4 is rendered conductive, while transistor T-3 is rendered non-conductive. Accordingly, a positive D.C. voltage, for example, is again produced across the output terminals 126. Thus, the magnitude and polarity of the D.C. output voltage or error signal at the terminals 126 is proportional to the amplitude and phase of the A.C. amplifier voltage (as well as the A.C. output bridge voltage).

If it be assumed that the amplifier output voltage is "out-of-phase" with the reference voltage, the relative polarity of these voltages changes. Specifically, during the first half cycle the upper end of the secondary winding 124 is negative while the lower end is positive. On the other hand, as above, the junction of resistors 140 and 142 is positive and the junction fo the resistors 144 and 146 is negative. As a result, transistor T-3 is rendered conductive and T-4 is non-conductive. However, the transistor T-3 now functions as a "bi-lateral device" in the sense that the current flows from the emitter to collector instead of from collector to emitter as in the above described conduction. With the transistor T-3 rendered conductive, a D.C. voltage is produced across the output terminals 126 having, for example, a negative amplitude because of the "out-of-phase" relationship of the amplifier output and reference voltage. However, similar to the "in-phase signal," the amplitude of the output D.C. voltage is proportional to the output of the A.C. bridge output voltage.

During the second cycle of the "out-of-phase" amplifier output voltage, the above described polarity of the amplifier output and reference voltage is reversed, whereby the transistor T-4 is rendered conductive and transistor T-3 is rendered non-conductive. Consequently, a D.C. output voltage having a negative amplitude is produced at the output terminals 126, i.e., a D.C. voltage having the same amplitude and polarity as the D.C. voltage produced by the conductive transistor T-3.

It will be appreciated that the D.C. output voltage at the output terminals 126 is suitably connected to the controlled arrangement, for example, to the ignition device associated with the furnace, so as to either increase or decrease the temperature in the monitored areas.

Assuming that the controlled arrangement responds properly to the D.C. output voltage generated by the control system 10, i.e., the temperature in the monitored areas returns to its desired level, the control system 10 is restored to its balanced or quiescent condition. As a result, the operative condition of one or more of the sensing elements 12a, 12b or 12c is returned to its desired operating point, with the result that the associated bridge network or networks are balanced. Consequently, no output voltage is developed by the bridge networks 20, 22, and 24, and no A.C. bridge output voltage is supplied by the bridge potentiometer 38 and no voltage is supplied to the demodulator circuit 18. Hence, the normally non-conductive transistors T-3 and T-4 remain in their non-conductive condition and no D.C. output voltage at the ouput terminals 126 is produced. In short, the entire control system 10 returns to its quiescent state until the operative condition of one or more of the sensing devices 12a, 12b, and 12c is changed.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A circuit for controlling the operative state of a responsive means in accordance with variations in one or more sensed conditions that are monitored by said circuit and which are adjusted and/or compensated for by said responsive means; which control circuit comprises a plurality of parallelly connected bridge networks; each of said bridge networks including means for balancing the bridge network under a preselected condition and a sensing means that monitors said condition and responds to a variation from said preselected condition to effect unbalance of said bridge network; impedance means connected in circuit with said parallelly connected bridge networks so that the unbalance of one or more said bridge networks causes an alternating current output voltage to be developed across said impedance means; said output voltage having an amplitude and phase indicative of the unbalanced condition of one or more of said parallelly connected bridge networks; an amplifier circuit connected to said impedance means for amplifying said output voltage; and a full wave phase sensitive demodulator circuit having an input and an output; said input of said demodulator circuit being connected to said amplifier circuit and the output of said demodulator circuit being connectable to a responsive means; said demodulator circuit producing a direct current voltage across the output thereof having a magnitude and polarity corresponding to the amplitude and phase of the voltage supplied to the input of said demodulator circuit by said amplifier circuit whereby the operative state of a responsive means connected across the output of said demodulator circuit is directly controlled in accordance with the unbalanced condition of one or more of said parallelly connected bridge networks.

2. A circuit for controlling the operative state of a responsive means in accordance with variations in one or more sensed conditions that are monitored by said circuit and which are adjusted and/or compensated for by said responsive means; which control circuit comprises a plurality of parallelly connected bridge networks; each of said bridge networks including means for balancing the bridge network under a preselected condition and a sensing means that monitors said condition and responds to a variation from said preselected condition to effect unbalance of said bridge network; impedance means connected in circuit with said parallelly connected bridge means so that the unbalance of one or more said bridge networks causes an alternating current signal to be developed across said impedance means; said output signal having an amplitude and phase indicative of the unbalanced condition of one or more of said parallelly connected bridge networks, an amplifier circuit connected to said impedance means for amplifying said output signal; and a full wave phase sensitive demodulator circuit having an input and an output; said input of said demodulator circuit being connected to said amplifier circuit and the output of said demodulator circuit being connectable to a responsive means; said demodulator circuit including a pair of bilaterally conductive transistors that are rendered effective by the amplified output from said amplifier circuit so that a direct current voltage is developed across the output thereof; said direct current voltage having a magnitude and polarity corresponding to the amplitude and phase of the signal supplied to the input of said demodulator circuit by said amplifier circuit whereby the operative state of a responsive means connected across the output of said demodulator circuit is directly controlled in accordance with the unbalanced condition of one or more of said parallelly connected bridge networks.

3. A circuit for controlling the operative state of a responsive means in accordance with variations in one or more sensed conditions that are monitored by said circuit and which are adjusted and/or compensated for by said responsive means; which control circuit comprises a plurality of parallelly connected bridge networks; each of said bridge networks including means for balancing the bridge network under a preselected condition and a sensing means that monitors said condition and responds to a variation from said preselected condition to effect unbalance of said bridge network; impedance means connected in circuit with said parallelly connected bridge means so that the unbalance of said bridge networks causes a composite alternative current output signal to be developed across said impedance means; selected ones of said bridge networks being connected to said impedance means through adjustable coupling means so that the components of the composite signal derived from said selected ones of said bridge networks are selectively variable; said composite output having an amplitude and phase indicative of the unbalanced condition of said bridge networks; an amplifier circuit connected to said impedance means for amplifying said output voltage, and a full wave phase sensitive demodulator circuit having an input and an output, said input of said demodulator circuit being connected to said amplifier circuit and the output of said demodulator circuit being connectable to a responsive means; said demodulator circuit producing a direct current voltage across the output thereof; said direct current voltage having a magnitude and polarity corresponding to the amplitude and phase of the voltage supplied to the input of said demodulator circuit by said amplifier circuit whereby the operative state of a responsive means connected across the output of said demodulator circuit is directly controlled in accordance with the unbalanced condition of said parallelly connected bridge networks.

References Cited by the Examiner
UNITED STATES PATENTS

| | | | |
|---|---|---|---|
| 2,573,175 | 10/57 | Bergen et al. | 240—233 |
| 2,908,829 | 10/59 | Schaeve | 240—233 |
| 3,042,872 | 7/62 | Brahm | 307—88.5 |

ARTHUR GAUSS, *Primary Examiner.*